(12) United States Patent
Billmaier et al.

(10) Patent No.: US 8,190,196 B2
(45) Date of Patent: May 29, 2012

(54) GENERATION AND USE OF TEMPORARY PHONE NUMBERS

(75) Inventors: James A Billmaier, Woodinville, WA (US); John M Kellum, Woodinville, WA (US); Kristopher C Billmaier, Kirkland, WA (US); David P Billmaier, Woodinville, WA (US)

(73) Assignee: Patent Navigation Inc., Woodinville, WA (US)

( * ) Notice: Subject to any disclaimer, the term of this patent is extended or adjusted under 35 U.S.C. 154(b) by 1494 days.

(21) Appl. No.: 11/642,380

(22) Filed: Dec. 20, 2006

(65) Prior Publication Data

US 2007/0155435 A1   Jul. 5, 2007

Related U.S. Application Data

(60) Provisional application No. 60/755,586, filed on Dec. 29, 2005.

(51) Int. Cl.
*H04M 1/00* (2006.01)

(52) U.S. Cl. ..................... 455/551; 370/395.2

(58) Field of Classification Search .......... 455/445, 455/414.1; 370/395.2
See application file for complete search history.

(56) References Cited

U.S. PATENT DOCUMENTS

| | | | |
|---|---|---|---|
| 5,590,184 A * | 12/1996 | London | 379/142.09 |
| 5,933,785 A | 8/1999 | Tayloe | |
| 6,324,394 B1 * | 11/2001 | Vazvan | 455/406 |
| 6,327,353 B1 | 12/2001 | Fukuzawa et al. | |
| 6,393,117 B1 | 5/2002 | Trell | |
| 6,453,162 B1 * | 9/2002 | Gentry | 455/433 |
| 7,020,256 B2 | 3/2006 | Jain et al. | |
| 7,613,454 B2 * | 11/2009 | Zhang | 455/432.1 |
| 2002/0131445 A1 * | 9/2002 | Skubic et al. | 370/465 |
| 2003/0063735 A1 * | 4/2003 | Brockenbrough et al. | 379/245 |
| 2006/0227959 A1 * | 10/2006 | Mitchell | 379/221.13 |
| 2007/0030824 A1 * | 2/2007 | Ribaudo et al. | 370/328 |
| 2007/0171910 A1 * | 7/2007 | Kumar | 370/392 |
| 2008/0188207 A1 * | 8/2008 | Lee | 455/414.1 |

* cited by examiner

*Primary Examiner* — Marcos Batista

(74) *Attorney, Agent, or Firm* — FSP LLC

(57) ABSTRACT

A wireless service network includes logic to receive one or more requests for temporary dialable numbers from wireless devices, and logic to determine temporary wireless numbers and to provide the temporary wireless numbers to the wireless devices in response to the requests.

17 Claims, 3 Drawing Sheets

GENERATION AND USE OF TEMPORARY PHONE NUMBERS

PRIORITY CLAIM

This application claims priority to U.S. Provisional Application 60/755,586, entitled GENERATION AND USE OF TEMPORARY PHONE NUMBERS and filed on Dec. 29, 2005, the contents of which are hereby incorporated by reference herein in their entirety.

TECHNICAL FIELD

The present disclosure relates to the generation and assignment of temporary telephone numbers.

SUMMARY

The following summary is intended to highlight and introduce some aspects of the disclosed embodiments, but not to limit the scope of the claims. Thereafter, a detailed description of illustrated embodiments is presented, which will permit one skilled in the relevant art to make and use various embodiments.

A method may include and/or involve logic to identify the presence of one or more other proximate wireless devices, and logic to determine one or more temporary dialable numbers to provide to the other devices that the other devices can use to dial the wireless device. The temporary dialable numbers may include and/or involve one or more numbers that may be dialed a limited number of times before expiring, and/or one or more numbers that expire after a period of time, and/or logic to negotiate the temporary dialable numbers with the other devices, and/or logic to negotiate the temporary dialable numbers with a wireless network service provider. The one or more numbers that expire after a period of time may include and/or involve one or more numbers that expire at a particular time and-or date. The temporary dialable numbers may include and/or involve one or more numbers that expire as a result of the wireless device leaving a service area in which the numbers were allocated.

A wireless service network may include and/or involve logic to receive one or more requests for temporary dialable numbers from wireless devices, and logic to determine temporary wireless numbers and to provide the temporary wireless numbers to the wireless devices in response to the requests. The temporary dialable numbers may include and/ or involve one or more numbers that may be dialed a limited number of times before expiring, and/or one or more numbers that expire after a period of time, and/or one or more numbers that expire as a result of the wireless device leaving a service area in which the numbers were allocated. The one or more numbers that expire after a period of time may include and/or involve one or more numbers that expire at a particular time and-or date.

The wireless service network may include and/or involve logic to associate the temporary dialable numbers with the requesting wireless devices and-or subscribers associated with the requesting wireless devices.

The wireless service network may include and/or involve logic to associate one or more expiration conditions with the temporary wireless numbers, and to cease providing to the wireless devices call requests that specify the temporary wireless numbers as a result of occurrence of one or more of the expiration conditions.

The wireless service network may include and/or involve logic to provide to the wireless devices call requests that specify the temporary wireless numbers.

The wireless service network may include and/or involve logic to provide to the wireless devices call requests that specify the temporary wireless numbers until the occurrence of one or more expiration conditions associated with the temporary wireless numbers.

The wireless service network may include and/or involve logic to charge wireless network service subscribers a per-use fee for the temporary dialable numbers.

Other system/method/apparatus aspects are described in the text (e.g., detailed description and claims) and drawings forming the present application.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

"Logic" refers to signals and/or information that may be applied to influence the operation of a device. Software, hardware, and firmware are examples of logic. Hardware logic may be embodied in circuits. In general, logic may comprise combinations of software, hardware, and/or firmware.

System to Provide Temporary Dialable Numbers to One or More Wireless Devices

Figure 1:
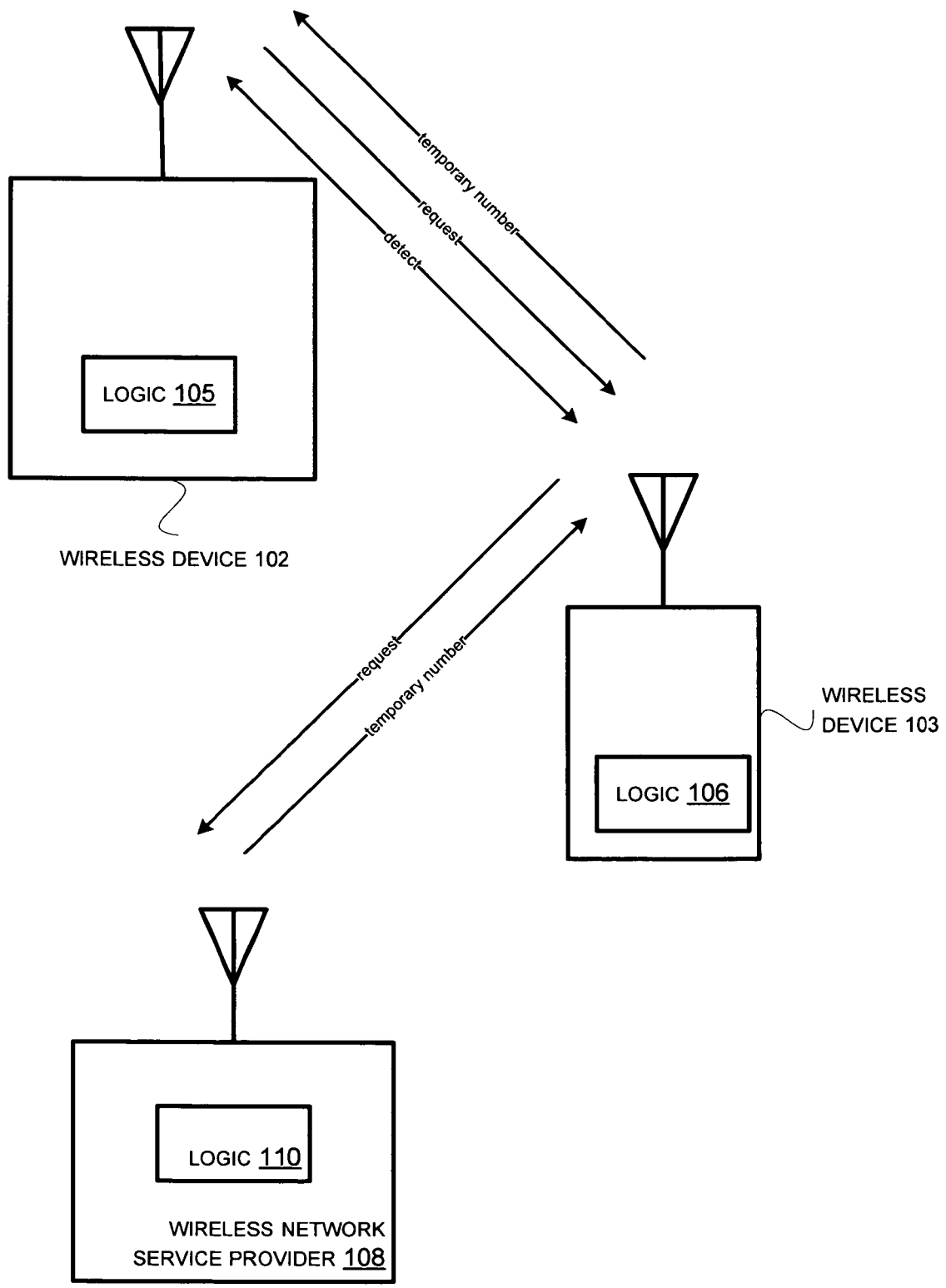
FIG. 1 is a block diagram of an embodiment of a system to provide temporary dialable numbers to one or more wireless devices.

FIG. 1 is a block diagram of an embodiment of a system to provide temporary dialable numbers to one or more wireless devices.

The system may include a first wireless device 103 for which temporary dialable numbers are allocated and assigned, and a second wireless device 102. In some embodiments, a wireless network service provider 108, e.g. cell phone service provider, may also be involved. The service provider may include logic 110 to facilitate acts described herein.

The first wireless device may also include logic 106 to facilitate acts described herein.

One or more of the first and/or second wireless devices 103, 102, alone or in combination, may detect proximity between the first and second wireless devices 102,103, initiating a request and communication of temporary dialable numbers to the second wireless device 102. For example, the second wireless device 102 may be a reservation system in a restaurant, and when a diner with a cell phone (the first wireless device 103) walks in, the cell phone may communicate one or more temporary dialable numbers to the reservation system. The reservation system may in turn dial a temporary number for the cell phone with a text message, email, or voice message indicating that the diner's table is available. In this manner the diner's primary cell phone number is not unnecessarily distributed, while enabling the reservation system to contact the diner even when the diner is not nearby. The wireless device 103 may request that the network service provider 108 provide one or more wireless numbers to provide to the second wireless device 102.

Various embodiments may include other elements/features not illustrated in FIG. 1 and not necessary to understanding the described embodiments.

Dynamic Allocation of Dialable Numbers

The system includes logic to identify the presence of one or more other proximate wireless devices, and logic to determine one or more temporary dialable numbers to provide to the other devices that the other devices can use to dial the wireless device (e.g. temporary number service logic).

The temporary number service logic may include logic to negotiate the temporary dialable numbers with the other devices, and/or logic to negotiate the temporary dialable numbers with a wireless network service provider.

The temporary dialable numbers may include one or more numbers that may be dialed a limited number of times before expiring, one or more numbers that expire after a period of time, one or more numbers that expire at a particular time and-or date, and/or one or more numbers that expire as a result of the wireless device leaving a service area in which the numbers were allocated.

Figure 2:
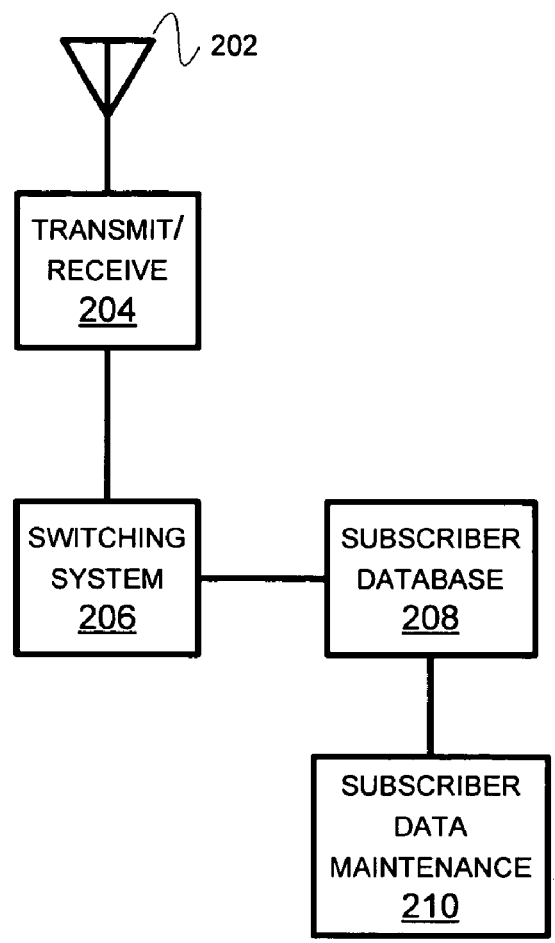
FIG. 2 is a block diagram of an embodiment of a wireless service provider that provides temporary dialable numbers to one or more wireless devices.

Wireless Service Provider That Provides Temporary Dialable Numbers to One or More Wireless Devices FIG. 2 is a block diagram of an embodiment of a wireless service provider that provides temporary dialable numbers to one or more wireless devices.

The service provider includes one or more antennae 202 for transmitting and/or receiving wireless signals to and/or from wireless devices, and a transmitter/receiver arrangement 204 for transmitting and/or receiving wireless signals to and/or from wireless devices.

The service provider may also include a switching system 206 to facilitate call establishment and route call information to and from wireless devices, and a subscriber database 208 to provide storage and retrieval of subscriber information, such as temporary dialable numbers and/or expiration information for the temporary dialable numbers.

The service provider may include logic 210 to maintain the subscriber information, and more particularly to monitor expiration conditions associated with temporary dialable numbers and to cause expiration of the numbers as a result of the expiration conditions being met.

Network Allocation and Expiration of Dialable Numbers

The wireless service network may include logic to receive one or more requests for temporary dialable numbers from wireless devices, and logic to determine temporary wireless numbers and to provide the temporary wireless numbers to the wireless devices in response to the requests.

The wireless service network may include logic to associate the temporary dialable numbers with the requesting wireless devices and-or subscribers associated with the requesting wireless devices.

The wireless service network may include logic to provide to the wireless devices call requests that specify the temporary wireless numbers.

The wireless service network may include logic to associate one or more expiration conditions with the temporary wireless numbers, and to cease providing to the wireless devices call requests that specify the temporary wireless numbers as a result of occurrence of one or more of the expiration conditions.

The wireless service network may include logic to provide to the wireless devices call requests that specify the temporary wireless numbers until the occurrence of one or more expiration conditions associated with the temporary wireless numbers.

The wireless service network logic to charge wireless network service subscribers a per-use fee for the temporary dialable numbers.

The temporary dialable numbers may include one or more numbers that may be dialed a limited number of times before expiring, one or more numbers that expire after a period of time, one or more numbers that expire at a particular time and-or date, and/or one or more numbers that expire as a result of the wireless device leaving a service area in which the numbers were allocated.

Methods of Providing Temporary Dialable Numbers

Figure 3:
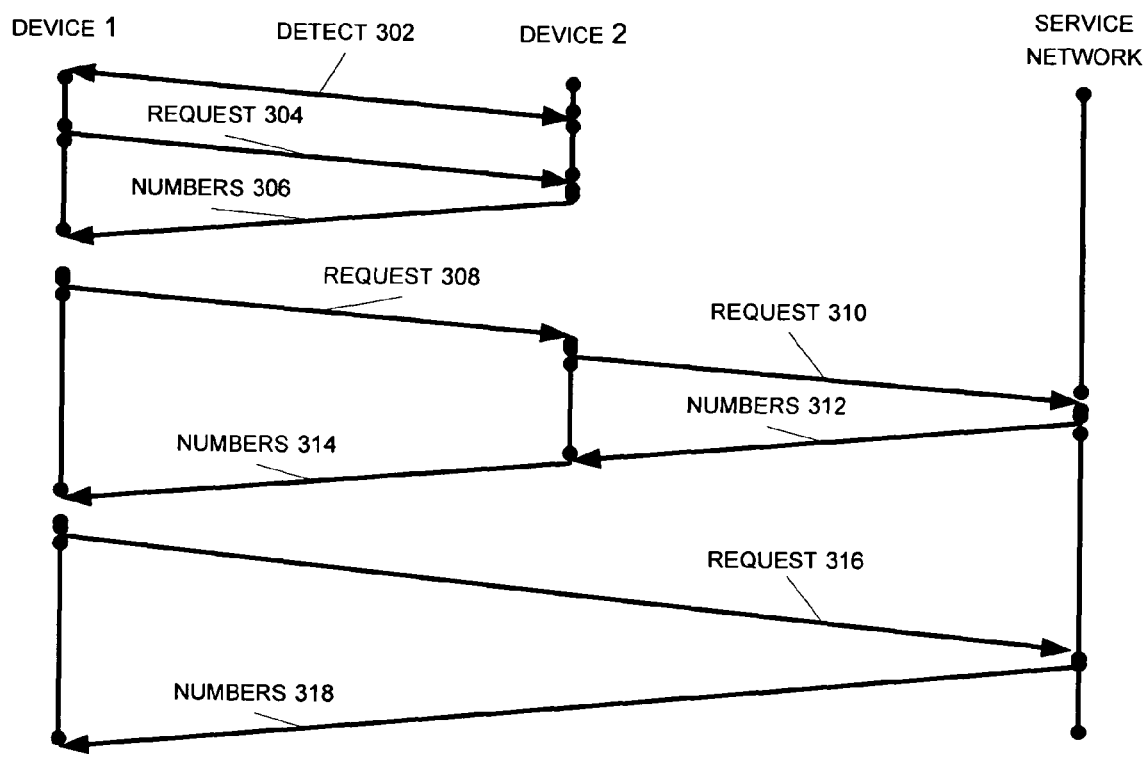
FIG. 3 is an action flow diagram of an embodiment of various methods to provide temporary dialable numbers to one or more wireless devices.

FIG. 3 is an action flow diagram of an embodiment of various methods to provide temporary dialable numbers to one or more wireless devices.

In an embodiment exemplified by acts 302-306, the two devices at 302 detect the presence of one another, for example using Bluetooth, WiFi, or other short-range wireless technology. At 304 the first device requests temporary numbers that it may use to contact the second device. The second device provides the one or more temporary numbers at 306.

In an embodiment exemplified by acts 308-314, the first device requests temporary numbers at 308 that it may use to contact the second device. The second device at 310 requests temporary numbers from a wireless service provider of the second device. At 312 the wireless service provider provides the one or more temporary numbers to the second device, and the second device provides them to the first device at 314 (e.g. via short range wireless technology, or using Short Message Service or other technique via the wireless service provider).

In an embodiment exemplified by acts 316-318, the first device may request the temporary numbers directly from the wireless provider of the second device (e.g. using a data and/or control channel of the wireless provider).

Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A device comprising:
    nontransitory machine memories and/or hardware embodying logic to identify the presence of one or more proximate wireless devices; and
    nontransitory machine memories and/or hardware embodying logic to determine, prior to initiation of a call, one or more temporary dialable numbers that may be dialed a limited number of times before expiring to provide to the wireless devices that the wireless devices can use to dial the device for the call, the temporary dialable numbers for dialing between the proximate wireless devices and the device in particular.

2. The device of claim 1, wherein the logic to determine one or more temporary dialable numbers to provide to the wireless devices further comprises:
    logic to negotiate the temporary dialable numbers with the wireless devices.

3. The device of claim 1, wherein the logic to determine one or more temporary dialable numbers to provide to the wireless devices further comprises:
    logic to negotiate the temporary dialable numbers with a wireless network service provider.

4. The device of claim 3, wherein the temporary dialable numbers further comprises:
    one or more numbers that expire as a result of the device leaving a service area in which the numbers were allocated.

5. A wireless service network comprising:
    nontransitory computer readable memories and/or hardware embodying logic to receive one or more requests for temporary dialable numbers from wireless devices; and
    nontransitory computer readable memories and/or hardware embodying logic to determine, prior to initiation of a call, temporary dialable numbers that may be dialed a limited number of times before expiring, and to provide the temporary dialable numbers to the wireless devices in response to the requests, the temporary dialable numbers provided in response to proximity of the wireless devices with another device, and for dialing the call between the wireless devices and the other device in particular.

6. The wireless service network of claim 5, wherein the temporary dialable numbers further comprises:
    one or more numbers that expire as a result of the wireless device leaving a service area in which the numbers were allocated.

7. The wireless service network of claim 5, further comprising:
logic to associate the temporary dialable numbers with the requesting wireless devices and- or subscribers associated with the requesting wireless devices.

8. The wireless service network of claim 5, further comprising:
logic to associate one or more expiration conditions with the temporary wireless numbers, and to cease providing to the wireless devices call requests that specify the temporary wireless numbers as a result of occurrence of one or more of the expiration conditions.

9. The wireless service network of claim 5, further comprising:
logic to provide to the wireless devices call requests that specify the temporary wireless numbers.

10. The wireless service network of claim 5, further comprising:
logic to provide to the wireless devices call requests that specify the temporary wireless numbers until the occurrence of one or more expiration conditions associated with the temporary wireless numbers.

11. The wireless service network of claim 5, further comprising:
logic to charge wireless network service subscribers a per-use fee for the temporary dialable numbers.

12. A method comprising:
a mobile communication device identifying the presence of one or more proximate wireless devices; and
the mobile communication device causing one or more temporary dialable numbers that may be dialed a limited number of times before expiring to be determined and provided to the wireless devices, prior to initiation of a call, that the wireless devices can use for the call to dial the mobile communication device in particular.

13. The method of claim 12, wherein the temporary dialable numbers further comprise:
one or more numbers that expire after a period of time.

14. The method of claim 13, wherein the one or more numbers that expire after a period of time further comprise:
one or more numbers that expire at a particular time and-or date.

15. The method of claim 12, wherein determining one or more temporary dialable numbers to provide to the wireless devices further comprises:
negotiating the temporary dialable numbers with the wireless devices.

16. The method of claim 12, wherein determining one or more temporary dialable numbers to provide to the wireless devices further comprises:
negotiating the temporary dialable numbers with a wireless network service provider.

17. The method of claim 16, wherein the temporary dialable numbers further comprise:
one or more numbers that expire as a result of the device leaving a service area in which the numbers were allocated.

* * * * *